(12) United States Patent
Yadavalli et al.

(10) Patent No.: US 9,042,431 B1
(45) Date of Patent: May 26, 2015

(54) WIDE BAND DETERMINISTIC INTERFACE

(75) Inventors: Venkat Yadavalli, San Jose, CA (US);
Sridhar Krishnamurthy, San Jose, CA (US); Gerardo Orlando, Newton, MA (US); David Richardson King, Shrewsbury, MA (US); Ken Clauss, Tempe, AZ (US); Mark Krumpoch, Shrewsbury, MA (US); Peter Markou, Westborough, MA (US)

(73) Assignee: Altera Corporation, San Jose, CA (US)

( * ) Notice: Subject to any disclaimer, the term of this patent is extended or adjusted under 35 U.S.C. 154(b) by 1130 days.

(21) Appl. No.: 12/391,712

(22) Filed: Feb. 24, 2009

(51) Int. Cl.
*H04B 1/38* (2006.01)
*H04L 1/24* (2006.01)
*H04L 1/00* (2006.01)

(52) U.S. Cl.
CPC ............. *H04L 1/243* (2013.01); *H04L 1/0001* (2013.01)

(58) Field of Classification Search
CPC ...... H04L 25/03057; H04L 1/243; G06F 1/10

USPC .................................. 375/219–223, 354–377
See application file for complete search history.

(56) References Cited

U.S. PATENT DOCUMENTS

| | | | |
|---|---|---|---|
| 7,227,918 B2 * | 6/2007 | Aung et al. | 375/355 |
| 2008/0031311 A1 * | 2/2008 | Haas et al. | 375/221 |

\* cited by examiner

*Primary Examiner* — Shuwang Liu
*Assistant Examiner* — Ross Varndell
(74) *Attorney, Agent, or Firm* — Weaver Austin Villeneuve & Sampson LLP

(57) ABSTRACT

A transceiver with non-deterministic delay characteristics is analyzed and adjusted to provide a transceiver with deterministic delay characteristics. The transceiver may be implemented with a variety of device types to support high bandwidth operation over a wide range of frequencies. Deterministic behavior allows use of the transceiver in source synchronous interfaces. The transceiver may also be dynamically analyzed and adjusted during operation as operation frequency changes.

19 Claims, 7 Drawing Sheets

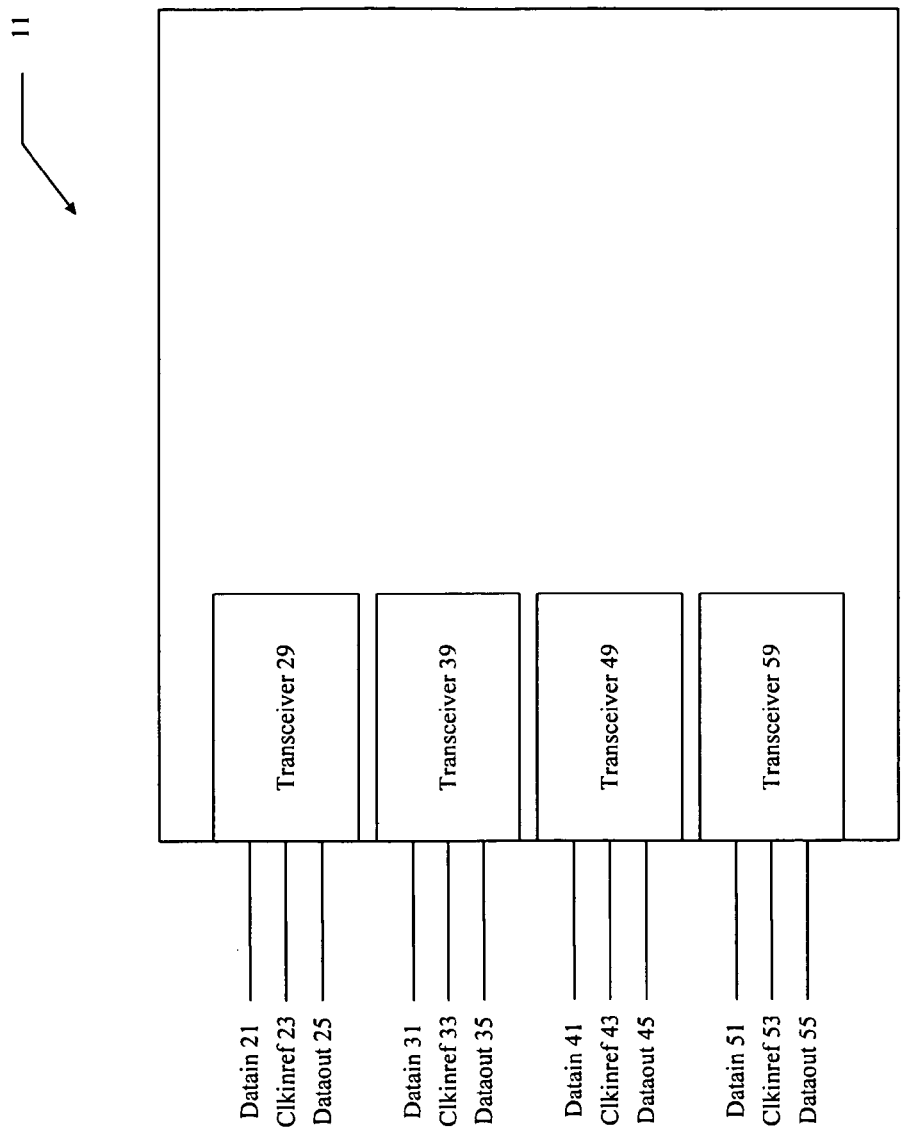

WIDE BAND DETERMINISTIC INTERFACE

CROSS REFERENCE TO RELATED APPLICATIONS

This application claims priority to U.S. Provisional Patent Application No. 61/116,720, filed on Nov. 21, 2008 and titled "WIDE BAND DETERMINISTIC INTERFACE," the entirety of which is hereby incorporated by reference as though provided herein.

DESCRIPTION OF RELATED ART

The present disclosure relates generally to transceivers used for data communications.

A variety of devices include transceivers to allow efficient data communications. Transceivers typically include serializer/deserializers (SERDES), clock recovery units, transmit and receive phase lock loops (PLLs), word aligners, rate matching buffers, 10b/8b decoders, and byte ordering logic to allow data communications at a variety of data rates. Transceivers have many desirable properties. However, transceivers also have a number of undesirable properties that that limit their use in a variety of interfaces.

Consequently, it is desirable to provide improved transceiver interfaces for data communications.

BRIEF DESCRIPTION OF THE DRAWINGS

The disclosure may best be understood by reference to the following description taken in conjunction with the accompanying drawings, which illustrate particular embodiments of the present invention.

FIG. 1A illustrates one example of a device having a transceiver.

DESCRIPTION OF PARTICULAR EMBODIMENTS

Figure 1B:
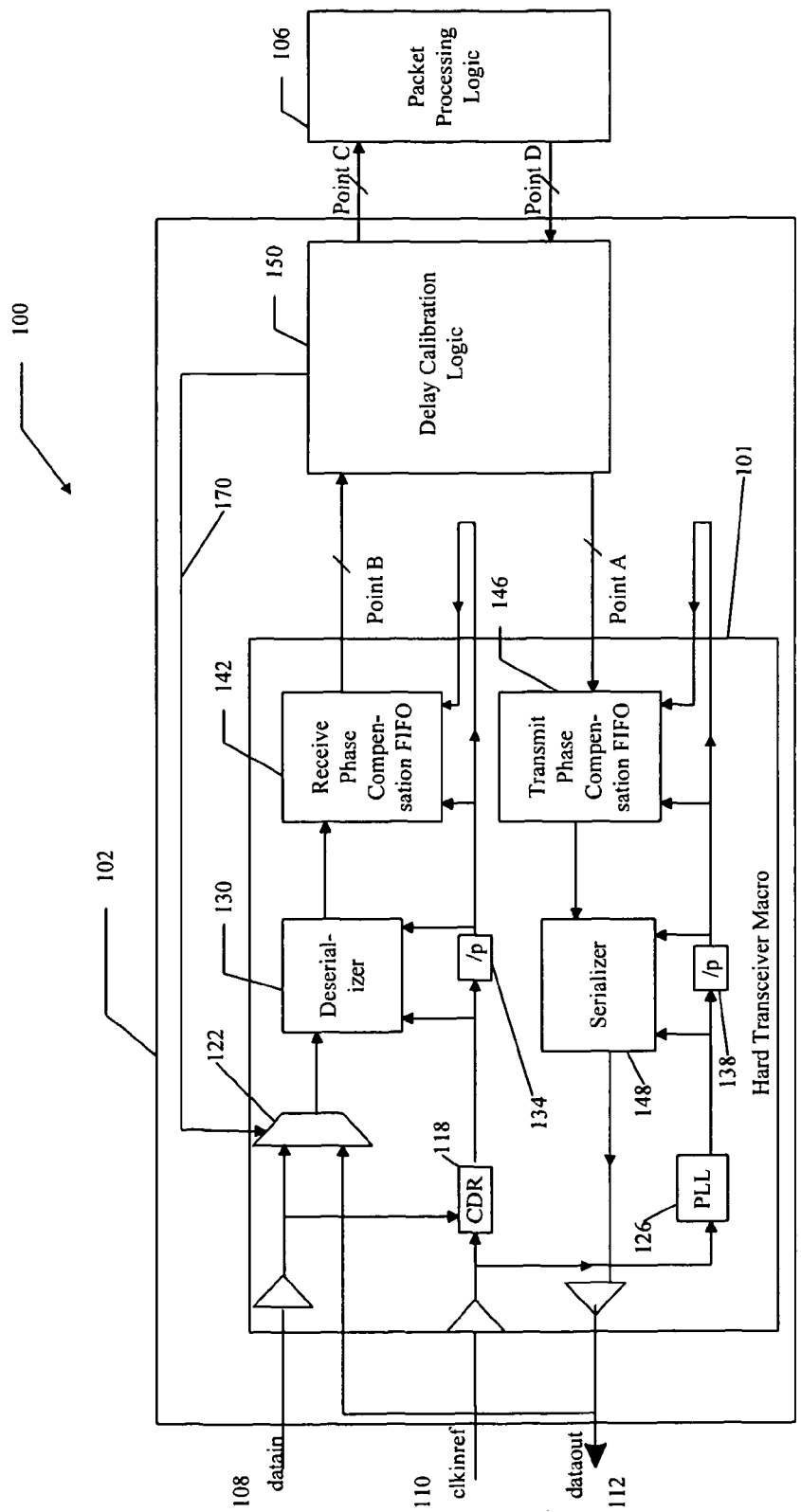
FIG. 1B is a block diagram of some components of a field programmable gate array.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of synchronous interfaces. However, it should be noted that the techniques of the present invention can be applied to a number of interfaces. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a processor is used in a variety of contexts. However, it will be appreciated that multiple processors can also be used while remaining within the scope of the present invention unless otherwise noted. Furthermore, the techniques and mechanisms of the present invention will sometimes describe two entities as being connected. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

A transceiver with non-deterministic delay characteristics is analyzed and adjusted to provide a transceiver with deterministic delay characteristics. The transceiver may be implemented with a variety of device types to support high bandwidth operation over a wide range of frequencies. Deterministic behavior allows use of the transceiver in source synchronous interfaces. The transceiver may also be dynamically analyzed and adjusted during operation as operation frequency changes.

Example Embodiments

Many transceivers have non-deterministic behavior that limits their use in a variety of applications. In particular examples, transceivers use physical coding sublayer ("PCS") blocks and physical medium attachment ("PMA") blocks that have non-deterministic and variable latency behavior that limits their use in source synchronous interfaces. Conventional transceivers are also set for use at a particular frequency, which forces entire systems to run at that frequency, often the maximum frequency. In many instances, the maximum frequency may not be needed at a particular time and power is inefficiently consumed to support the maximum frequency.

High data throughput in a transceiver is required in applications in high speed telecommunications, networking, and wireless domains. These applications need multi-gigabit data rates as well as the deterministic latency. These unique requirements make source synchronous interfaces unsuitable for use with a variety of transceivers that provide non-deterministic delay characteristics. Consequently, techniques and mechanisms are provided to efficiently measure and compensate for non-deterministic behavior.

In particular embodiments, a system establishes a closed feedback loop at power-up or reset. While operating in a feedback close-loop mode, the system measures the non-deterministic starting point of a transceiver block. In particular examples, the system adds delay until a constant deterministic delay is achieved, and the closed loop is opened to allow user traffic. Established compensation is tracked to detect instantaneous changes in receive and transmit operation and compensate accordingly. The system also automatically tracks the reference clock.

The system can also dynamically tune itself to particular operating frequencies. A system no longer needs to run at the same frequency at all times.

FIG. 1A illustrates one example of a device that uses transceivers with non-deterministic latency characteristics. A device 11 includes multiple transceivers 29, 39, 49, and 59. The device may be a programmable logic device (PLD), application specific integrated circuit (ASIC), application specific standard product (ASSP), or a variety of other devices. According to various embodiments, transceiver 29 has datain 21, clkinref 23, and dataout 25 lines, transceiver 39 has datain 31, clkinref 33, and dataout 35 lines, transceiver 49 has datain 41, clkinref 43, and dataout 45 lines, transceiver 59 has datain 51, clkinref 53, and dataout 55 lines.

According to various embodiments, each transceiver 29, 39, 49, and 59 implements building blocks for a number of protocols including PCI Express, Gigabit Ethernet, SDI, SerialLite II, XAUI, Serial RapidIO and OIF CEI-6G. In particular embodiments, each transceiver 29, 39, 49, and 59 includes bit serializers and deserializers (SERDES), clock recovery units, transmit and receive phase lock loops (PLLs), word aligners, rate matching buffers, 10b/8b decoders, byte ordering logic, and/or custom logic to allow data communication using a variety of protocols.

FIG. 1B illustrates some components of an example field programmable gate array 100 having packet processing logic and transceiver 102. According to various embodiments, transceiver 102, includes hard transceiver macro 101 and delay calibration logic ("DCL") 150. In particular embodiments, DCL 150 includes digital logic circuitry, whereas the hard transceiver macro 101 is typically implemented with PCS and PMA blocks that may include analog components. As such, the transceiver has a variable and unpredictable latency in both start up and in steady state operation.

According to various embodiments, data enters through data in line ("datain") 108 and is passed to multiplexer 122. A clock in reference ("clkinref") signal 110 passes to phase locked loop circuit element 126 and divider 138 that provides a low speed parallel clock to serializer 148 and transmit phase compensation FIFO 146. Clock in reference signal 110 also passes to clock data recovery ("CDR") 118 circuit element en route to deserializer 130 and divider 134 that provides a low speed parallel clock. In particular embodiments, parallel data output from deserializer 130 passes to receive phase compensation FIFO and then through reference point B before passing through DCL 150, reference point C, packet processing logic 106, reference point D, DCL 150, reference point A, transmit phase compensation FIFO 146, and serializer 148. According to various embodiments, the serialized (parallel) data then exits via data out line ("dataout") 112. Serial loopback control 170 provides a feedback loop to mux 122

Demanding applications for an FPGA, in particular the packet processing logic 106 implemented within an FPGA, prefer or require certainty in the delay of incoming packets (at reference point C). Thus, non-deterministic characteristics are problematic. DCL 150, as discussed in more detail below, adjusts the timing of packets passing to/from transceiver 102 to provide a deterministic interface to packet processing logic 106. This is especially beneficial for wide or variable band applications for data transmission and FPGA 100.

Figure 2:
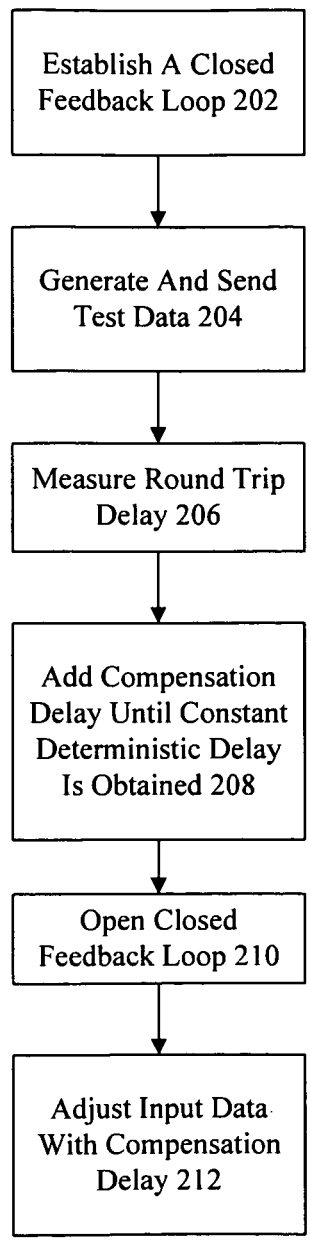
FIG. 2 is illustrates one technique for analyzing delay characteristics associated with a transceiver.

FIG. 2 illustrates one example for determining a compensation delay to provide constant deterministic delay in a transceiver. At 202, a system establishes a closed feedback loop. According to various embodiments, the closed feedback loop is established at power-up of a system. In other examples, the closed feedback loop is established at reset. At 204, test data is generated and send over the closed feedback loop. According to various embodiments, the closed feedback loop allows determination of non-deterministic delay in a data path associated with the transceiver. At 206, round trip delays are measured. According to various embodiments, round trip delays may have variation due to non-deterministic delay components in the data path. Non-deterministic delay components may include analog circuitry. SERDES delay is also sensitive to transmission frequency.

At 208, delay is added to determine a compensation delay. The compensation delay provides a transceiver with deterministic behavior. Although this may increase delay slightly for transceiver operations, it is recognized that constant deterministic delay is important for a variety of applications such as satellite, wireless, and communications applications. In some examples, the compensation delay may be several clock cycles. At 210, the closed feedback loop is opened to allow normal operation. Input data at the transceiver is adjusted with the compensation delay 212 to provide a transceiver with deterministic delay characteristics.

Figure 3:
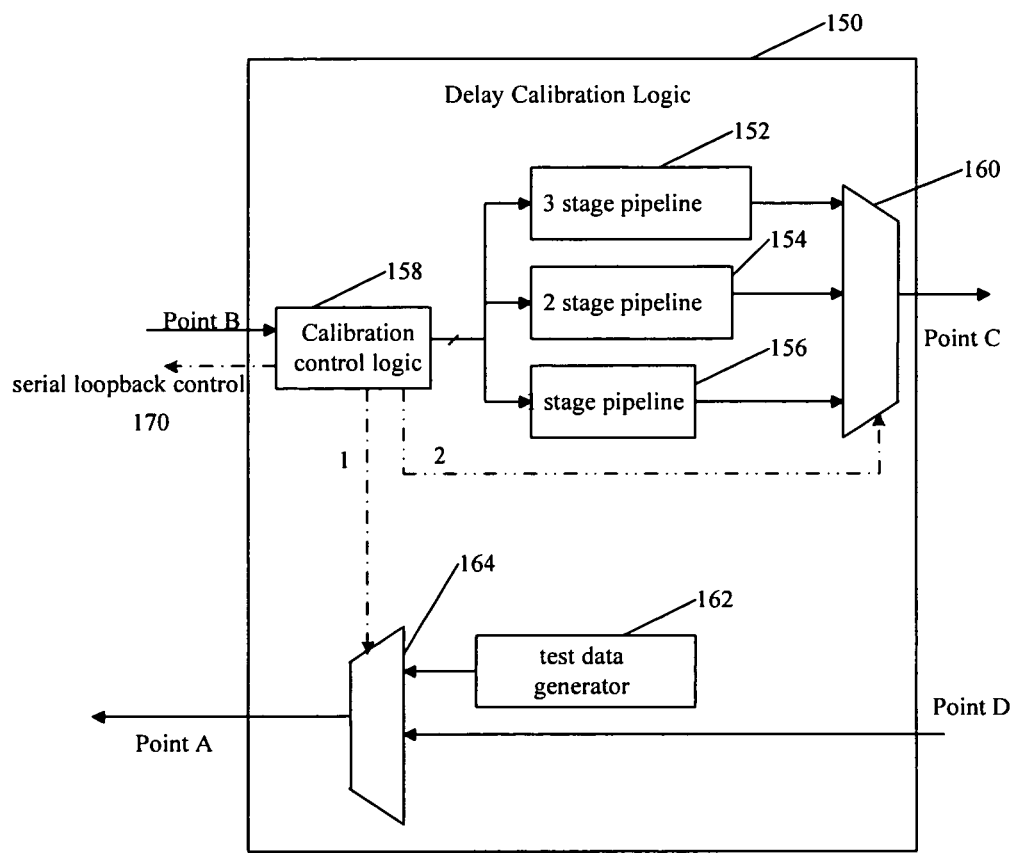
FIG. 3 illustrates an embodiment of delay calibration logic.

FIG. 3 illustrates one example of delay calibration logic (DCL). As seen in FIG. 3, DCL 150 comprises CCL 158, which is coupled to incoming data line (point B) from FIFO 142, and to serial loopback control line 170. It is also coupled to mux 160 (line 2) and mux 164 (line 1). DCL 150 also comprises a group of pipelines with increasing pipeline stages. In the example shown in FIG. 3 three pipelines are shown (more or less may be present): 3 stage pipeline 152, 2 stage pipeline 154, and 1 stage pipeline 156. The outputs of the pipelines are connected to mux 160.

Figure 4:
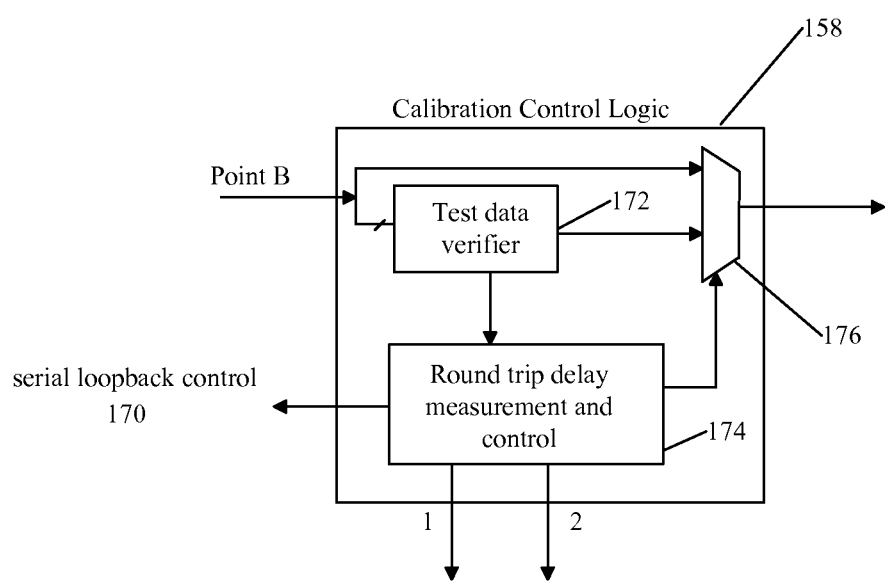
FIG. 4 illustrates an embodiment of calibration control logic.

FIG. 4 illustrates an embodiment of CCL 158. CCL 158 comprises test data verifier 172, mux 176, and round trip delay measurement and control logic ("RTL") 174. Test data verifier verifies that the signal received at point B is in fact test data and not operational data.

Test data generator 162 creates a training pattern and RTL 174 determines how long the delay is (e.g. at a steady state of operation) from point A to point B. The higher the measured delay, the lower the number of pipeline stages that DCL 150 will use to delay the signal as it passes from point B to point C. For example if the number of parallel clock cycles required for data to travel from point A to point B varies from 10-12 clock cycles, and in one specific training instance a round trip takes 12 clock cycles then data will be delayed by one clock cycle by passing it through one stage pipeline 156, whereas in the round trip takes 10 clock cycles it will be delayed by three cycles by passing through the three stage pipeline 152. Once the calibration is complete, DCL 150 will exit the calibration phase (the closed loop is opened) and allow regular operation such that data received at data input 108 will flow through and exit at data output 112. DCL 150 will ensure that the any delay encountered in passing through transceiver 100 is always constant, despite that the delay from the hard transceiver macro 101 varies under different conditions.

This deterministic transceiver interface enables the FPGA to be used in demanding applications where non deterministic behavior is undesirable or simply unacceptable. For example, whereas prior transceivers would allow interfaces to reach high data rates, the variable latency non deterministic behavior made them unsuitable for source synchronous interfaces. Thus, such systems that needed deterministic behavior bypassed the use of SERDES in transceivers, and were therefore limited in bandwidth to lower transmission rates (e.g. to 400 Mbps or less).

Prior solutions that utilized one or more oscillators to generate one or more fixed clocks were not universal, whereas the present invention enables the use of a variable reference clock that the transceiver automatically tracks. Transceiver 102, in other words, automatically tunes itself as the operation frequency changes.

Although the techniques and mechanisms of the present invention can be implemented on a variety of device, one example of a device that provides particular flexibility is a programmable chip.

Figure 5:
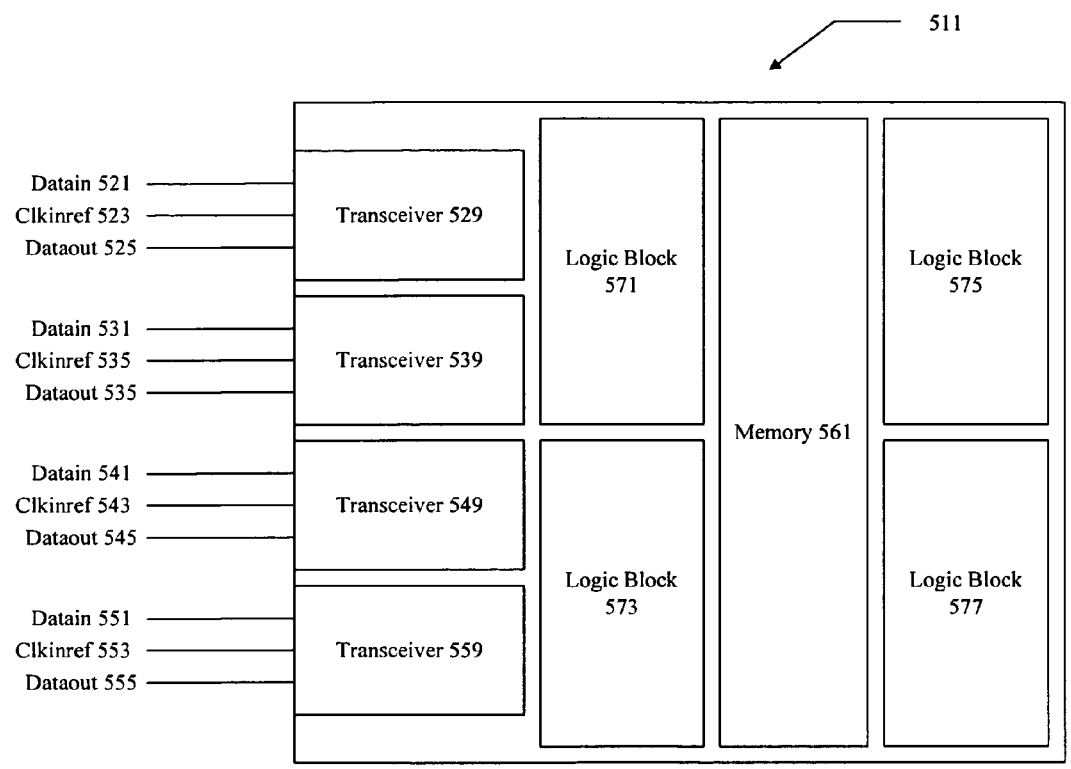
FIG. 5 illustrates one example of a device that can provide wide band deterministic interfaces.

FIG. 5 illustrates one example of a programmable chip that can support a wide band deterministic interface. The programmable chip 511 includes multiple transceivers 529, 539, 549, and 559. According to various embodiments, transceiver 529 has datain 521, clkinref 523, and dataout 525 lines, transceiver 539 has datain 531, clkinref 533, and dataout 535 lines, transceiver 549 has datain 541, clkinref 543, and dataout 545 lines, transceiver 559 has datain 551, clkinref 553, and dataout 555 lines.

The programmable chip 511 may also included other hard-coded blocks such as digital signal processing blocks. According to various embodiments, the programmable chip includes memory 561 and logic 571, 573, 575, and 577. The hard-coded blocks and logic blocks may be used to implement processor cores, accelerators, and other peripherals.

According to various embodiments, the programmable chip uses different types of resources that can be interchangeably used in different allocations to implement the system on a programmable chip. In one example, the programmable chip uses logic elements for implementing each of the various components on the programmable chip.

Logic elements typically can be implemented using components such as antifuses, static RAM, and EPROMS. Any mechanism on a programmable chip that performs an operation on a given number of input lines to provide one or more outputs based on information programmed is herein referred to as a logic element. Some logic elements are implemented as combinations of look up tables and switches for performing Boolean operations on input lines. In one example, a logic element includes a 16-bit SRAM lookup table (LUT) that can implement an arbitrary 4-input logic function, circuitry that forms a fast carry chain and a fast cascade chain, a register and preset/reset logic for the register.

Figure 6:
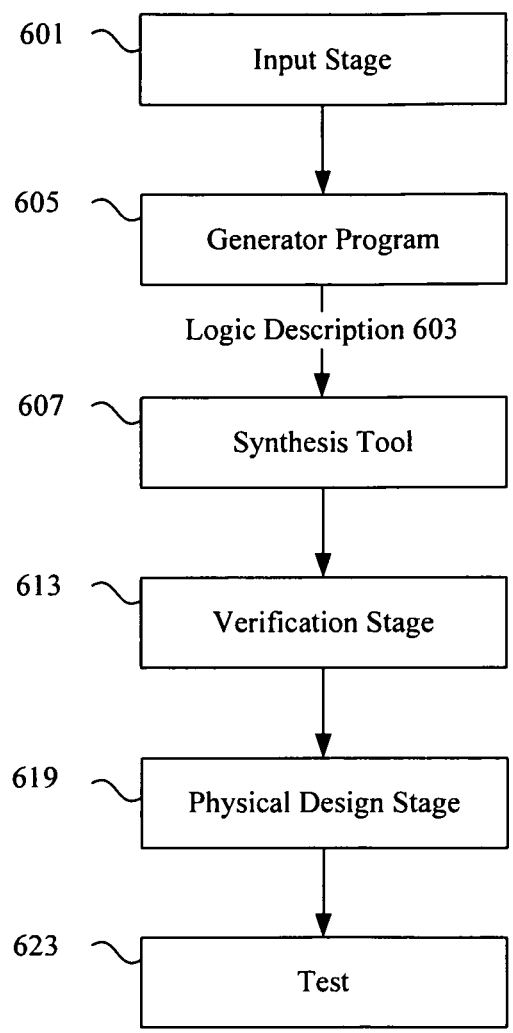
FIG. 6 illustrates one example of a technique for implementing a device supporting wide band deterministic interfaces.

FIG. 6 is a diagrammatic representation showing implementation of an electronic device. An input stage 601 receives selection information typically from a user for logic such as a processor core as well as other components such as a streaming output device to be implemented on an electronic device. In one example, the input received is in the form of a high-level language program. A generator program 605 creates a logic description and provides the logic description along with other customized logic to any of a variety of synthesis tools, place and route programs, and logic configuration tools to allow a logic description to be implemented on an electronic device.

In one example, an input stage 601 often allows selection and parameterization of components to be used on an electronic device. The input stage 601 also allows configuration of variable or fixed latency support. In some examples, components provided to an input stage include intellectual property functions, megafunctions, and intellectual property cores. The input stage 601 may be a graphical user interface using wizards for allowing efficient or convenient entry of information. The input stage may also be a text interface or a program reading a data file such as a spreadsheet, database table, or schematic to acquire selection information. The input stage 601 produces an output containing information about the various modules selected.

In typical implementations, the generator program 605 can identify the selections and generate a logic description with information for implementing the various modules. The generator program 605 can be a Perl script creating HDL files such as Verilog, Abel, VHDL, and AHDL files from the module information entered by a user. In one example, the generator program identifies a portion of a high-level language program to accelerate. The other code is left for execution on a processor core. According to various embodiments, the generator program 605 identifies pointers and provides ports for each pointer. One tool with generator program capabilities is System on a Programmable Chip (SOPC) Builder available from Altera Corporation of San Jose, Calif. The generator program 605 also provides information to a synthesis tool 607 to allow HDL files to be automatically synthesized. In some examples, a logic description is provided directly by a designer. Hookups between various components selected by a user are also interconnected by a generator program. Some of the available synthesis tools are Leonardo Spectrum, available from Mentor Graphics Corporation of Wilsonville, Oreg. and Synplify available from Synplicity Corporation of Sunnyvale, Calif. The HDL files may contain technology specific code readable only by a synthesis tool. The HDL files at this point may also be passed to a simulation tool 609.

As will be appreciated by one of skill in the art, the input stage 601, generator program 605, and synthesis tool 607 can be separate programs. The interface between the separate programs can be a database file, a log, or simply messages transmitted between the programs. For example, instead of writing a file to storage, the input stage 601 can send messages directly to the generator program 605 to allow the generator program to create a logic description. Similarly, the generator program can provide information directly to the synthesis tool instead of writing HDL files. Similarly, input stage 601, generator program 605, and synthesis tool 607 can be integrated into a single program.

A user may select various modules and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 607.

A synthesis tool 607 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

A verification stage 613 typically follows the synthesis stage 607. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 613, the synthesized netlist file can be provided to physical design tools 619 including place and route and configuration tools. A place and route tool typically locates logic cells on specific logic elements of a target hardware device and connects wires between the inputs and outputs of the various logic elements in accordance with logic required to implement an electronic design. The device can also be physically tested at 623.

For programmable logic devices, a programmable logic configuration stage can take the output of the place and route tool to program the logic device with the user selected and parameterized modules. According to various embodiments, the place and route tool and the logic configuration stage are provided in the Quartus Development Tool, available from Altera Corporation of San Jose, Calif. As will be appreciated by one of skill in the art, a variety of synthesis, place and route, and programmable logic configuration tools can be tested using various techniques of the present invention.

As noted above, different stages and programs can be integrated in a variety of manners. According to one embodiment, the input stage 601, the generator program 605, the synthesis tool 607, the verification tools 613, and physical design tools 619 are integrated into a single program. The various stages are automatically run and transparent to a user. The program can receive the user selected modules, generate a logic description depicting logic for implementing the various selected modules, and implement the electronic device. As will be appreciated by one of skill in the art, HDL files and EDF files are mere examples of a logic description. Other file formats as well as internal program representations are other examples of a logic description.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of master and slave components and should not be restricted to the ones mentioned above. It is therefore intended that the invention be interpreted to include all variations and equivalents that fall within the true spirit and scope of the present invention.

What is claimed is:

1. A method, comprising:
    compensating for non-deterministic data processing time in a transceiver, for a plurality of operation frequencies, the transceiver comprising a receiver circuitry having variable latency components including a deserializer, a transmitter circuitry including a serializer, a delay calibration logic (DCL), the DCL being communicatively coupled between an output of the receiver circuitry and an input of the transmitter circuitry, and a feedback path configured to be switchable by the DCL between an open state and a closed state, said compensating including for each transceiver operation frequency, sending test data over the feedback path while the feedback path is in the closed state; and, with the DCL:
        measuring a plurality of travel times for the test data;
        determining, from the plurality of travel times, a compensation delay that provides a constant deterministic delay for the transceiver;
        opening the feedback path; and
        adding the compensation delay to input data received at the transceiver; wherein
            the DCL comprises a calibration control logic, and a plurality of pipelines for processing a plurality of parallel data lines, the calibration control logic being disposed between the output of the receiver circuitry and the plurality of pipelines.

2. The method of claim 1, further comprising:
    detecting instantaneous changes in receive and transmit operation and the compensation delay.

3. The method of claim 1, further comprising:
    determining a plurality of compensation delays for a plurality of transceiver channels.

4. The method of claim 1, further comprising:
    the transceiver dynamically self-tuning to operate at at least two of the plurality of transceiver operation frequencies.

5. The method of claim 1, wherein the transceiver is further configured to provide receive phase compensation.

6. The method of claim 1, wherein the transceiver is further configured to provide transmit phase compensation.

7. The method of claim 5, further comprising sending test data through a receiver phase compensation first-in/first-out over the closed loop feedback path.

8. The method of claim 6, further comprising sending test data through a receiver phase compensation first-in/first-out over the closed loop feedback path.

9. A device, comprising:
    a transceiver comprising a receiver circuitry having variable latency components including a deserializer, a transmitter circuitry including a serializer, a delay calibration logic (DCL), the DCL being communicatively coupled between an output of the receiver circuitry and an input of the transmitter circuitry and a feedback path configured to be switchable by the DCL between an open state and a closed state;
    wherein the DCL comprises a calibration control logic, and a plurality of pipelines for processing a plurality of parallel data lines; the calibration control logic being disposed between the output of the receiver circuitry and the plurality of pipelines; and
    the DCL is coupled with a packet processing logic and with the feedback path, the DCL being configured to:
        measure the latency associated with the variable latency components;
        determine a compensation delay, the compensation delay comprising a number of clock cycles necessary to compensate for the variable latency components; and
        add the compensation delay to input data received at the transceiver so as to provide a constant deterministic delay of data to the packet processing logic.

10. The circuit of claim 9, wherein the transceiver circuit further comprises phase locked loop circuitry.

11. The circuit of claim 9, wherein the transceiver circuit further comprises clock data recovery circuitry.

12. The circuit of claim 9, wherein the delay calibration logic comprises a test data generator.

13. The circuit of claim 12, wherein the DCL comprises a first mux, and a second mux; the calibration control logic being communicatively coupled with the first mux, the first mux being disposed between the plurality of pipelines and an input of the packet processing logic; the second mux being disposed between the input of the transmitter circuitry and an output of the packet processing logic and having an input from the test data generator.

14. The circuit of claim 13, wherein the plurality of pipelines comprises pipelines having x to x+3 pipeline stages.

15. The circuit of claim 9, wherein the receiver circuitry further comprises phase compensation first-in/first-out circuitry.

16. The circuit of claim 9, wherein the transmitter circuitry further comprises phase compensation first-in/first-out circuitry.

17. An apparatus, comprising:
   means for compensating for non-deterministic processing time in a transceiver, for each of a plurality of transceiver operation frequencies, the transceiver comprising a receiver circuitry having variable latency components including a deserializer, a transmitter circuitry including a serializer, a delay calibration logic (DCL), the DCL being communicatively coupled between an output of the receiver circuitry and an input of the transmitter circuitry, and a feedback path configured to be switchable by the DCL between an open state and a closed state, the DCL comprising:
   means for sending test data through the SERDES over the feedback path while the feedback path is in the closed state;
   means for measuring a plurality of travel times for the test data;
   means for determining, from the plurality of travel times, a compensation delay that provides a constant deterministic delay for the transceiver;
   means for opening the feedback path; and
   means for adding the compensation delay to input data received at the transceiver; wherein:
      the DCL comprises a calibration control logic, and a plurality of pipelines for processing a plurality of parallel data lines; the calibration control logic being disposed between the output of the receiver circuitry and the plurality of pipelines.

18. The apparatus of claim 17, further comprising:
means for detecting instantaneous changes in receive and transmit operation and adjusting the compensation delay.

19. The apparatus of claim 17, further comprising:
means for determining a plurality of compensation delays for a plurality of transceiver channels.

* * * * *

UNITED STATES PATENT AND TRADEMARK OFFICE
CERTIFICATE OF CORRECTION

| | | |
|---|---|---|
| PATENT NO. | : 9,042,431 B1 | Page 1 of 1 |
| APPLICATION NO. | : 12/391712 | |
| DATED | : May 26, 2015 | |
| INVENTOR(S) | : Yadavalli et al. | |

It is certified that error appears in the above-identified patent and that said Letters Patent is hereby corrected as shown below:

Title page add item (60),

--Related U.S. Application Data

Provisional application No. 61/116,720, filed on November 21, 2008.--

Signed and Sealed this
Twenty-second Day of December, 2015

Michelle K. Lee
*Director of the United States Patent and Trademark Office*